(12) United States Patent
Ilmarinen

(10) Patent No.: US 8,844,678 B2
(45) Date of Patent: Sep. 30, 2014

(54) ARRANGEMENT FOR THE LUBRICATION OF SAW CHAINS

(75) Inventor: Jouko Ilmarinen, Jyväskylä (FI)

(73) Assignee: Osakeyhtiö SKF Aktiebolag, Espoo (FI)

( * ) Notice: Subject to any disclaimer, the term of this patent is extended or adjusted under 35 U.S.C. 154(b) by 0 days.

(21) Appl. No.: 13/882,002

(22) PCT Filed: Oct. 21, 2011

(86) PCT No.: PCT/IB2011/002592
§ 371 (c)(1),
(2), (4) Date: Apr. 26, 2013

(87) PCT Pub. No.: WO2012/056312
PCT Pub. Date: May 3, 2012

(65) Prior Publication Data
US 2013/0213741 A1  Aug. 22, 2013

(30) Foreign Application Priority Data
Oct. 28, 2010 (FI) ..................................... 20106125

(51) Int. Cl.
*F16N 11/08* (2006.01)
*B27B 17/12* (2006.01)

(52) U.S. Cl.
CPC ................ *F16N 11/08* (2013.01); *B27B 17/12* (2013.01)
USPC ....................................... 184/6.14

(58) Field of Classification Search
USPC ......................... 184/6.14, 15.1, 7.4
See application file for complete search history.

(56) References Cited

U.S. PATENT DOCUMENTS

| 3,236,036 | A | * | 2/1966 | Bailey et al. | 56/10.3 |
| 4,132,289 | A | * | 1/1979 | Makela | 184/15.1 |
| 4,802,555 | A | * | 2/1989 | Matsunaga et al. | 184/15.1 |
| 4,869,463 | A | * | 9/1989 | Niittyla et al. | 251/149.6 |
| 5,147,016 | A | * | 9/1992 | Antila | 184/7.4 |
| 6,170,611 | B1 | * | 1/2001 | Daly | 184/6.14 |
| 6,182,722 | B1 | * | 2/2001 | Ornberg | 144/34.1 |
| 6,363,981 | B1 | | 4/2002 | Butler et al. | |
| 6,929,098 | B2 | * | 8/2005 | Ilmarinen et al. | 184/50.1 |
| 8,225,907 | B2 | * | 7/2012 | Soucy et al. | 184/15.1 |
| 2010/0147628 | A1 | | 6/2010 | Soucy et al. | |
| 2013/0248294 | A1 | * | 9/2013 | Kettunen et al. | 184/26 |

FOREIGN PATENT DOCUMENTS

| DE | 4137177 A1 | 5/1992 |
| SU | 701594 A1 | 12/1979 |
| SU | 783001 A1 | 12/1980 |
| WO | WO9853667 A1 | 12/1998 |

* cited by examiner

*Primary Examiner* — William A Rivera
*Assistant Examiner* — Michael Riegelman
(74) *Attorney, Agent, or Firm* — Brian Peckjian; SKF USA Inc. Legal Department

(57) ABSTRACT

The purpose of the invention is an arrangement for the lubrication of saw chains, which comprises a grease tank (3) and apparatus for feeding grease via piping (4) to a saw chain. The apparatus for feeding grease to the saw chain (2) comprise a hydraulic device (3, 5, 6, 7), which is adapted to be powered by a hydraulic system (8, 9).

7 Claims, 1 Drawing Sheet

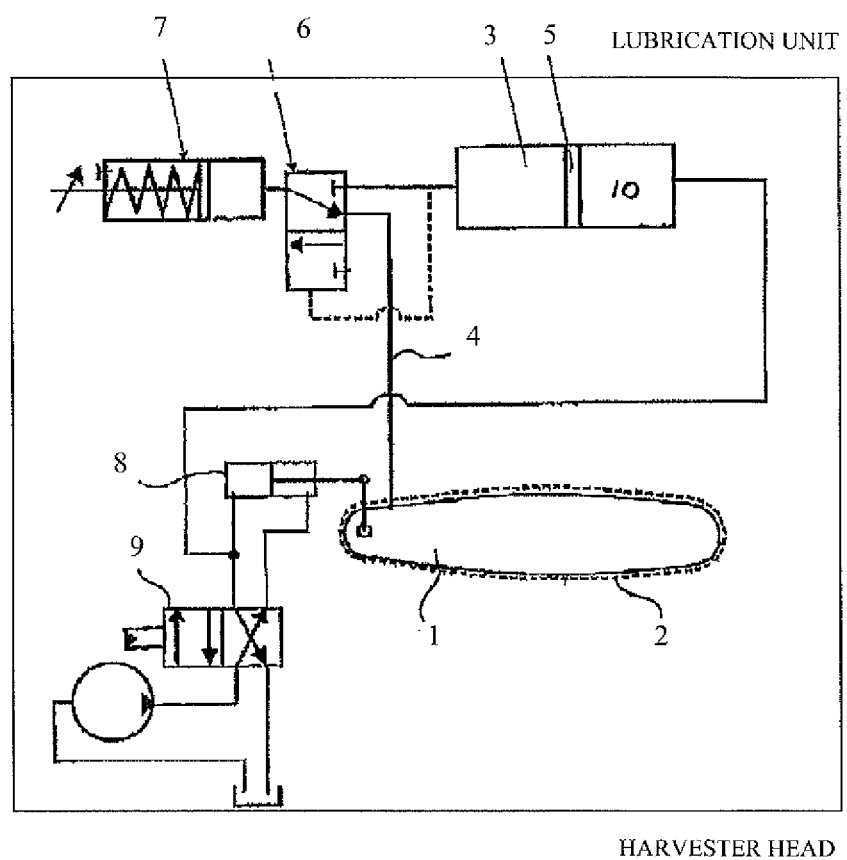

ARRANGEMENT FOR THE LUBRICATION OF SAW CHAINS

CROSS-REFERENCE TO RELATED APPLICATIONS

This application is the U.S. national stage of International Application No. PCT/IB2011/002592 filed on Oct. 21, 2011, which claims priority to Finland Patent Application No. 20106125 filed on Oct. 28, 2010, which are both herein incorporated by reference in their entirety.

FIELD OF THE INVENTION

The purpose of the invention is an arrangement for the lubrication of saw chains, which comprises a grease tank and apparatus for feeding grease via piping to a saw chain.

BACKGROUND OF THE INVENTION

Thus, the invention applies to the lubrication of chainsaw chains, as stated above. The invention applies particularly to the lubrication of the saw chain of the harvester chainsaw. On a chainsaw, the saw chain rotates in a continuous loop within the groove in the rim of the guide bar. At the other end of the guide bar is a drive gear wheel, which generates the rotation of the saw chain in the gap in the guide bar.

A frictional, resistant force affecting the movement of the saw chain is caused between the guide bar and the chain, as well as with the drive gear wheel. In order to reduce this frictional force, oil, acting as a lubricant, is fed to the saw chain. However, the rotation speeds of modern chainsaws are very high. As a result, the centrifugal forces are also very high in the saw chain, and consequently the oil is pushed very forcefully outwards from the chain links, causing a very high level of lubricating oil consumption. This leads to high operating costs. In addition, environmental issues have become very important and so the vast amount of oil leaked into the environment, despite the use of environmentally-friendly oils, is in no way a positive aspect.

On the basis of the above considerations, lubricants other than oil have started to be used in the lubrication of saw chains in the field. Recently, grease has come into use as a lubricant. An example of this kind of application is the solution from the US patent application 2010/0147628 A1, in which grease is fed with the aid of a pump. The pump is located far away from the actuator, meaning that the resultant pressurisation delay in the piping slows down lubrication and makes it imprecise. The pump receives an operational signal on the basis of saw activity, i.e. the pump is activated at certain times, depending on the activity of the saw. The solution also uses a timer, which regulates the activation intervals of the pump.

The drawback to the above solution is its complexity, which raises costs. Due to this complexity, the reliability of the device described above is not the best option for especially difficult circumstances.

SUMMARY OF THE INVENTION

The purpose of the invention is to form an arrangement by which previous technological flaws might be eliminated. This has been achieved with the aid of an arrangement accordant with the invention. The arrangement accordant with the invention is characterised by the apparatus for feeding grease to the saw chain, which include a hydraulic device, which is adapted to be powered by the hydraulic system of the saw.

An advantage of the invention is its simplicity, whereby the reliability and maintenance requirement of the arrangement are good, even in extreme working conditions. A further advantage of the invention is that, with the aid of the invention, the saw chain is lubricated in a simple and timely manner, i.e. lubrication is always reliable and only takes place when the saw chain requires lubrication, that is, when the saw is in use. Thus, lubricant consumption can be precise, lubricant wastage can be minimised and there are no lubrication delays affecting the piping of the lubricating device.

BRIEF DESCRIPTION OF THE DRAWINGS

The invention is explained in more detail below in the accompanying diagram, with the aid of an application of the invention, whereby FIG. 1 demonstrates one form of application of the arrangement accordant with the invention as a basic diagram.

FIG. 1 shows one application of the invention in the form of a basic diagram.

DETAILED DESCRIPTION OF THE INVENTION

In FIG. 1, the component requiring lubrication is indicated by the reference number 1—for example, the guide bar—and the saw chain is indicated by reference number 2. The structure and operation of the guide bar (1) and the saw chain are familiar to professionals in the field, so the components in question are not presented in further detail here.

The apparatus for lubricating the saw chain are an integral part of the saw chain. The above-mentioned apparatus comprise, among other things, piping, through which the lubricant (in this case, grease) is fed from the lubricant tank to the saw chain. The lubricant tank (in this case, a grease tank) is indicated in the figure by the reference number 3 and the piping, through which grease is applied to the saw chain (2), is indicated by reference number 4. The structure and operation of the lubricant tank and the piping are familiar to professionals in the field, and so the components in question are not presented in further detail here.

According to the essential purpose of the invention, apparatus for the lubrication of the chain include a hydraulic device, which is adapted to be powered by the hydraulic system of the saw.

The above-mentioned hydraulic device comprises a piston body (5), which is functionally connected to the grease tank (3); a valve body (6), which is also functionally connected to the grease tank (3); and a doser (7), which is functionally connected to the valve body (6).

As the hydraulic pressure of the saw rises, the piston body (5) is adapted to transfer grease from the grease tank (3) while shifting the valve body (6) from the first position to the second position, in order for the grease to reach the doser (7). As the hydraulic pressure falls, the valve body (6) is adapted to return to the first position, at which point the doser (7) is adapted to open to allow grease to reach the saw chain (2) via the piping (4).

In the application depicted in FIG. 1, the lubrication apparatus are powered by the guide bar swing hydraulic system. In FIG. 1, the guide bar (1) swing cylinder is indicated with the reference number 8 and the guide bar swing cylinder's control valve is marked with the reference number 9.

The pressure in the system may be at whatever pressure level is appropriate, for example, the pressure range may be as high as between 200 and 300 bars. NLGI 0-2 greases may be used as lubricant. High viscosity oils may also be used in the device. In this context, the term "grease" is to be broadly interpreted to include high viscosity oils as well.

Apparatus used to feed lubricant may also be powered by a source other than the guide bar swing hydraulic system. Examples of other kinds of application might include: powering by the saw chain rotation hydraulic system, by the log conveyor hydraulic system or by any other intermittent hydraulic system in the machine, which correctly controls the lubricating device. In this context, the term "machine" refers to the system to which the actuator—for example, the saw—belongs.

The doser (7) used in the arrangement accordant with the invention may be any appropriate doser. Examples of dosers might include a spring-actuated doser, particularly an adjustable spring-actuated doser, which can be adjusted, for example, by turning the adjustment screw.

In FIG. 1, a dotted line indicates the entity formed by the harvester head and the lubrication device. FIG. 1 shows the application of the invention, in which the hydraulic saw chain lubrication system is integrated into the harvester head.

The arrangement depicted in FIG. 1 works in the following way.

As stated above, the system is powered by the guide bar swing hydraulic system, by which pipe the saw chain receives a precise lubricant dose each time it is used.

The arrangement comprises a refillable grease tank (3), a piston body (5), a valve body (6), which may also be, e.g. a slide valve, for example from the spring-actuated grease doser (7) and piping (4) to the saw chain guide bar.

The grease tank (3) in the FIG. 1 application is divided into two parts by the piston body (5). Hydraulic pressure is transferred to one side of the piston body (5) in the grease tank, which is marked in FIG. 1 with the reference number 10. The above-mentioned hydraulic pressure is taken from the guide bar swing hydraulic system, as has been depicted above. The other side of the grease tank (3) is filled with lubrication grease ready for use.

As the hydraulic pressure rises, the piston body (5) shifts to the left in the diagram, while simultaneously the valve body (6) slide shifts from the first position to the second position and opens in order for the grease to pass to the spring-loaded doser.

As the hydraulic pressure falls, the valve body (6) slide returns to the first position allowing the grease to pass from the doser (7) through the piping (4) to the saw chain (2). The measure of the dose of lubricant can be adjusted, for example, by turning the adjustment screw, as depicted above.

The invention can be used to progress from copious saw chain lubrication to precisely measured lubrication, thus achieving minimal grease consumption and taking into account increasingly important environmental issues.

The invention is depicted using the above harvester application. However, the invention is not restricted to use with the harvester, but may also be applied elsewhere. The invention may be applied with complete freedom within the framework of the patent claims. The invention may therefore be applied freely, for example, in all kinds of other solutions which use a chainsaw. For example, static devices which use a chainsaw. These kinds of devices may be used, for example, in different timber factories, etc. The arrangement accordant with the invention can be installed with complete freedom within any system containing an actuator that requires lubrication, for example, a saw. The arrangement may be separate to the system or it may also be integrated into an actuator that requires lubrication, for example, a saw.

The invention claimed is:

1. An arrangement for the lubrication of saw chains, comprising:
    a grease tank, and
    an apparatus for feeding grease through piping to a saw chain, wherein
    the apparatus for feeding grease to the saw chain includes a hydraulic device, adapted to be powered by a saw hydraulic system wherein the hydraulic device includes;
    a piston body functionally connected to the grease tank,
    a valve body functionally connected to the grease tank, and a doser functionally connected to the valve body and wherein as hydraulic pressure of the saw rises, the piston body is adapted to transfer grease from the grease tank while shifting the valve body from a first position to a second position in order to allow the grease to pass to the doser and wherein as the hydraulic pressure falls, the valve body is adapted to return to the first position at which the doser is adapted to open to allow the grease to pass through the piping to the saw chain.

2. The arrangement according to claim 1, wherein the hydraulic device is adapted to be powered by a guide bar swing hydraulic system.

3. The arrangement according to claim 1, wherein the hydraulic device is adapted to be powered by a saw chain rotation hydraulic system.

4. The arrangement according to claim 1, wherein the doser is an adjustable doser.

5. The arrangement according to claim 1, wherein the doser is a spring-actuated doser.

6. The arrangement according to claim 1, wherein the hydraulic device is adapted to be powered by any machine's intermittent hydraulic pressure.

7. The arrangement according to claim 1, wherein the hydraulic device is integrated into the structure of the device requiring lubrication.

* * * * *